(12) United States Patent
Stocker

(10) Patent No.: US 8,575,787 B2
(45) Date of Patent: Nov. 5, 2013

(54) EMERGENCY LIGHTING METHODS AND SYSTEMS

(75) Inventor: William J. Stocker, Grand Ridge, IL (US)

(73) Assignee: Exelon Generation Company, LLC, Kennett Square, PA (US)

( * ) Notice: Subject to any disclaimer, the term of this patent is extended or adjusted under 35 U.S.C. 154(b) by 272 days.

(21) Appl. No.: 12/693,633

(22) Filed: Jan. 26, 2010

(65) Prior Publication Data

US 2010/0237702 A1     Sep. 23, 2010

Related U.S. Application Data

(60) Provisional application No. 61/147,276, filed on Jan. 26, 2009.

(51) Int. Cl.
*H02J 7/00*     (2006.01)

(52) U.S. Cl.
USPC ........................................................ 307/150

(58) Field of Classification Search
USPC ........................................................ 307/150
See application file for complete search history.

(56) References Cited

U.S. PATENT DOCUMENTS

| | | | | |
|---|---|---|---|---|
| 4,401,730 A | * | 8/1983 | Szymborski et al. | 429/53 |
| 5,376,479 A | * | 12/1994 | Gerner | 429/204 |
| 5,821,697 A | * | 10/1998 | Weber | 315/200 A |
| 6,848,798 B1 | * | 2/2005 | Logan et al. | 362/20 |
| 7,569,996 B2 | * | 8/2009 | Holmes et al. | 315/291 |
| 8,002,445 B2 | * | 8/2011 | Tachino et al. | 362/343 |

OTHER PUBLICATIONS

U.S. NRC Regulations, Appendix R to Part 50 (10 pages).
U.S. NRC Regulations, 50.65 Requirements for monitoring the effectiveness of maintenance at nuclear power plants (2 pages).
U.S. NRC Regulations, Regulatory Guide 1.160 (13 pages).
Rick Ramsey, Testing . . . Testing . . . How Good are the Batteries in Your Stock?, Battery Power Products & Technology, Nov./Dec. 2006, vol. 10, Issue 6 (3 pages).
Birns Emergency Lighting Fixture. "Model 4701 BIRNS ELF product page," purported date of Dec. 2, 2008; Webpage Citation, [Online] Retrieved on Aug. 4, 2013 from the Internet using Wayback Machine: URL:http://web.archive.org/web/20081202142756/http://www.birns.com/elf1.html; 3 pp.

* cited by examiner

*Primary Examiner* — Robert L. DeBeradinis
(74) *Attorney, Agent, or Firm* — Ballard Spahr LLP

(57) ABSTRACT

Described herein are systems and methods of emergency lighting comprising one or more light emitting diode (LED) lamps with a low-maintenance or maintenance-free battery. In one aspect, the battery is a sealed lead-acid battery. In one aspect, the battery is an absorbent glass mat (AGM) battery. In one aspect, the LED lamps can be a part of a LED assembly that can include an integrated voltage regulator. In one aspect, the one or more lamps are parabolic aluminized reflector luminares, or PAR lights such as PAR 46 light assemblies.

18 Claims, 2 Drawing Sheets

EMERGENCY LIGHTING METHODS AND SYSTEMS

CROSS REFERENCE TO RELATED APPLICATION

This application claims benefit of and priority to U.S. Provisional Patent Application No. 61/147,276, filed Jan. 26, 2009, which is hereby incorporated by reference in full and made a part hereof.

BACKGROUND

Nuclear facilities are required in the U.S. to monitor the effectiveness of maintenance at nuclear power plants. In 1991, the U.S. Nuclear Regulatory Commission (NRC) published the maintenance rule (MRule) as Section 50.65, "Requirements for Monitoring the Effectiveness of Maintenance at Nuclear Power Plants," of 10 CFR Part 50, "Domestic Licensing of Production and Utilization Facilities." The NRC's determination that a maintenance rule was needed arose from the conclusion that proper maintenance is essential to plant safety. As discussed in the regulatory analysis for this rule, there is a clear link between effective maintenance and safety as it relates to such factors as the number of transients and challenges to safety systems and the associated need for operability, availability, and reliability of safety equipment. In addition, good maintenance is also important in providing assurance those failures of other than safety-related structures, systems, and components (SSCs) that could initiate or adversely affect a transient or accident are minimized. Minimizing challenges to safety systems is consistent with the NRC's defense-in-depth philosophy. Maintenance is also important to ensure that design assumptions and margins in the original design basis are maintained and are not unacceptably degraded. Therefore, nuclear power plant maintenance is clearly important in protecting public health and safety.

Regulatory guide 1.160 of the MRule provides that examples of SSCs that should be considered include communications and emergency lighting systems, which are necessary to successfully mitigate accidents and transients and to use the emergency operating procedures (EOPs), although they may not directly address the accident or transient, or not be explicitly mentioned in the EOPs.

Appendix R to Part 50—Fire Protection Program for Nuclear Power Facilities Operating Prior to Jan. 1, 1979 requires that "emergency lighting units with at least an 8-hour battery power supply shall be provided in all areas needed for operation of safe shutdown equipment and in access and egress routes thereto. "The general purpose of emergency lighting systems is to provide sufficient lighting of desired quality in all areas of a station, indoors and outdoors, for normal, essential, and emergency conditions. AC station lighting is the normal lighting system used throughout a facility. Generally, normal AC lighting cabinets are energized from the non-ESF (Engineered Safety Features) 480-volt motor control centers.

AC emergency (or standby) station lighting is provided for station operation during a loss of normal AC auxiliary power. It is limited to the lighting required for the control and maintenance of ESF equipment (such as the ESF switchgear, emergency cooling equipment, control equipment, etc.) and for the access routes to this equipment. Generally, it is energized from the 480-Volt ESF motor control centers and thus receives power from the diesel generators when, and if, the sources of normal AC auxiliary power fail. Control room emergency lighting systems are similar to normal lighting systems except that the source of AC power is supplied from the engineered safety features power distribution system. These lights are normally in service at all times.

8-hour balance of plant (BOP) and safe shutdown battery emergency lighting units are provided in various locations in sufficient quantity to provide supplemental lighting for maintenance and supervision of both BOP and safe shutdown equipment. The battery emergency lighting system in the control room consists of battery operated lighting units located strategically within the control room. The units are normally de-energized and operated automatically upon failure of the ESF or non-ESF AC lighting systems.

Current emergency lighting systems are generally comprised of wet-cell batteries and incandescent lights. These systems require periodic maintenance and generally degrade over time. In some instances, these lighting systems are not capable of providing the desired eight hours of emergency lighting.

Therefore, systems and methods that overcome challenges found in the art, some of which are described above, are desired.

SUMMARY

Described herein are systems and methods of emergency lighting comprising one or more light emitting diode (LED) lamps with a low-maintenance or maintenance-free battery. In one aspect, the battery is a sealed lead-acid battery. In one aspect, the battery is an absorbent glass mat (AGM) battery. In one aspect, the LED lamps can be a part of a LED assembly that can include an integrated voltage regulator. In one aspect, the one or more lamps are parabolic aluminized reflector luminares, or PAR lights such as PAR 46 light assemblies.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
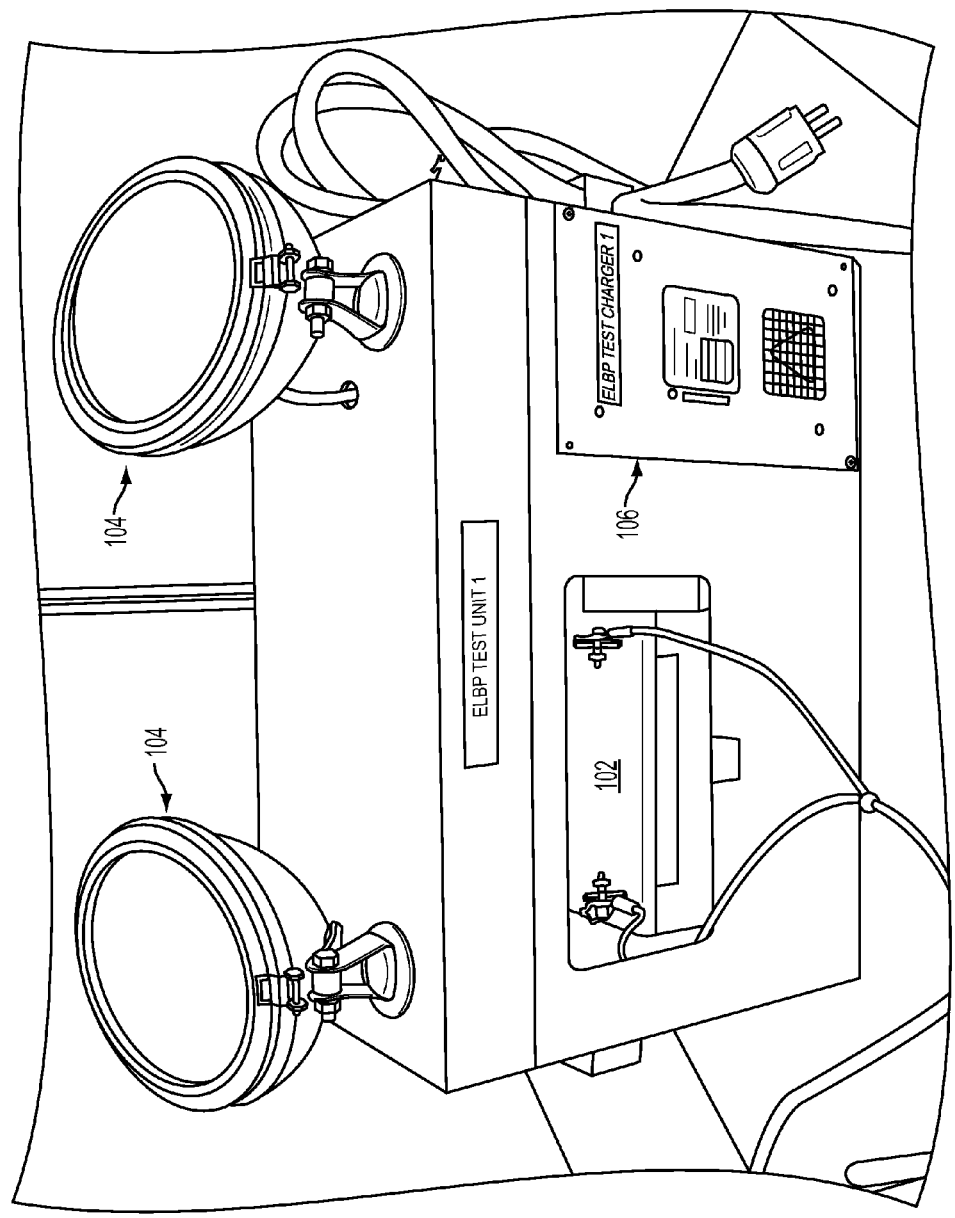
FIG. 1 illustrates one embodiment of an emergency lighting system.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Described herein are systems and methods of emergency lighting comprising one or more light emitting diode (LED) lamps with a low-maintenance or maintenance-free battery. In one aspect, the battery is a sealed lead-acid battery such as, for example, a lead-calcium battery. In one aspect, the battery is an absorbent glass mat (AGM) battery. In one aspect, the LED lamps can be a part of a LED assembly that can include an integrated voltage regulator. In one aspect, the one or more lamps are parabolic aluminized reflector luminares, or PAR lights such as PAR 46 light assemblies.

Embodiments described herein have low power requirements, lifetimes of about 100,000 hours, lighting output that meets or exceeds comparable incandescent lamps and maintains an almost constant light output during the entire discharge period of the battery. In one aspect, the use of immobilized, sealed lead-acid batteries generally eliminates the handling of electrolyte and the potential for electrolyte spillage or leakage. In one aspect, the use of AGM battery technology results in higher power density and higher seismic resistance for the batteries as compared to existing flooded (wet) cell batteries. In one aspect, embodiments described herein meet or exceed Appendix R to Part 50—Fire Protection Program for Nuclear Power Facilities Operating Prior to Jan. 1, 1979, which requires that "emergency lighting units with at least an 8-hour battery power supply shall be provided in all areas needed for operation of safe shutdown equipment and in access and egress routes thereto."

FIG. 1 illustrates one embodiment of an emergency lighting system 100. This embodiment comprises a battery 102, one or more lamp assemblies 104, and a battery 106. In one aspect, the battery 102 is a Power-Sonic PS12400 battery as manufactured by Power-Sonic Corporation, 7550 Panasonic Way, San Diego, Calif. 92154, though other batteries can also be used such as the Genesis G42EP as available from EnerSys of Reading, Pa., among others. The PS12400 battery is rated 480 watts at 12 VDC and 40 amp-hours. It has a power density of 15.5 watts/pound. It has an immobilized electrolyte comprising absorbed glass mat. It is generally maintenance free. The one or more lamp assemblies 104 are comprised of 4 watt LED lamps in a PAR 46 sealed beam package such as the PAR46-72-XCW-001 assembly as available from Ledtronics, Inc. of St. Louis, Mo., though other light assemblies can be used such as the F61224 floodlight as available from The LED Light, Inc. of Carson City, Nev., among others. The Ledtronics PAR46-72-XCW-001 LED sealed beam electrical connections are screw terminal type and non-polarized. In one aspect, the LEDs are rated 10-85 V AC/DC with a current draw of about 317 to 330 mA. In one aspect, the lamp assemblies can have a lifetime of about 100,000 hours. Paired with the PS12400 battery described above, the system can have a runtime of about 63 hours with two lamp assemblies 104 and about 42 hours with three lamp assemblies 104. Further comprising one embodiment of the system 100 is a battery charger 106, as are known to those of ordinary skill in the art. In one aspect, the charger can be a 12-volt DC constant voltage charger. The charger should meet charge voltage and current limits for the battery selected per the battery manufacturer's specifications. In one aspect, the charger 106 comprises a battery protection feature of load disconnect at 10.5 vdc (for a 12-volt battery) to prevent battery damage from deep discharges. In one aspect, the charger can return a 40AH battery to fully charged condition from 10.5 vdc within 24 hours. In one aspect, the system 100 further comprises a battery disconnect switch and a load disconnect switch to isolate the battery from the charger. This is to eliminate disconnecting the battery at the terminals during battery internal resistance checks and to prevent discharge due to parasitic charger load. In one aspect, the system 100 can comprise a momentary contact test switch for performing functional testing.

Figure 2:
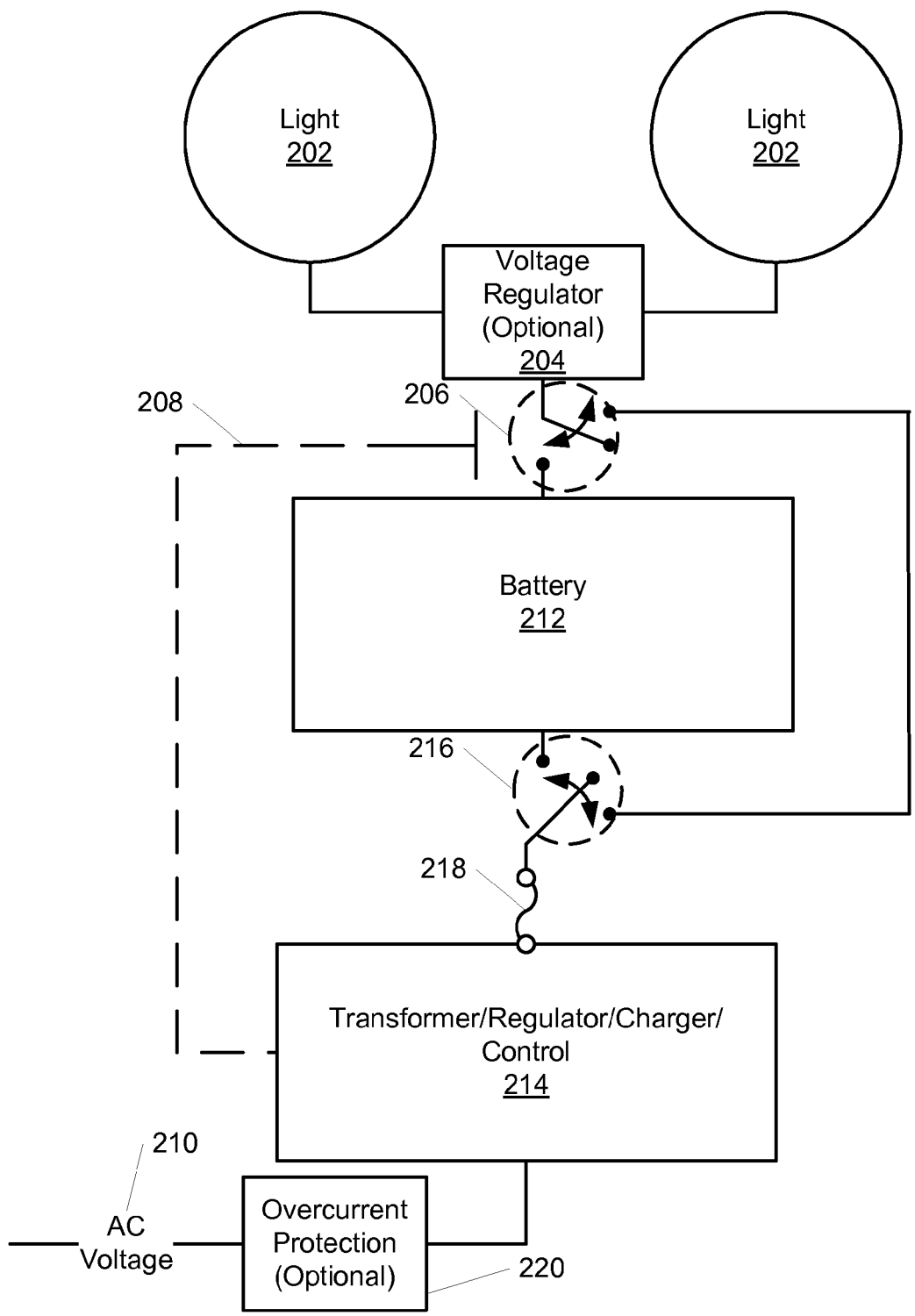
FIG. 2 illustrates a simplified block diagram for one embodiment of an emergency lighting system.

FIG. 2 illustrates a simplified block diagram for one embodiment of an emergency lighting system. The system 200 comprises one or more lamp assemblies 202. In various aspects, the system comprises one, two, three, four, etc. lamp assemblies 202. The system 200 may comprise a voltage regulator 204 that can be separate from or integrated into a lamp assembly 202. Further comprising an embodiment of the system is a load disconnect switch 206 that can be controlled 208 such that it closes and causes the light assemblies 202 to become energized upon the loss of AC voltage 210. Similarly, load disconnect switch 206 can be used to disconnect a battery 212 from the lamp assemblies 202, or to bypass the battery 212 (in cooperation with battery disconnect switch 216) and power the lamp assemblies 202 directly from a regulated power source such as a transformer/regulator/charger/control 214 as shown in FIG. 2. It is to be appreciated that while switches 206 and 216 are shown as single devises in FIG. 2, they may each be comprised of one or more switches, relays, contacts, coils and accompanying devices as known to one of ordinary skill in the art. The transformer/regulator/charger/control 214 comprises one or more transformers generally used to step down incoming AC voltage 210, one or more rectifiers as known to one of ordinary skill in the art to rectify the AC voltage to DC, and a regulator, as known to one of ordinary skill in the art, to regulate the DC voltage. The output DC voltage can be used to charge the battery 212 or directly power the light assemblies 202 (such as doing a test function). The transformer/regulator/charger/control 214 can further comprise a control board configured to control operation of the system 200 including sensing the loss of AC voltage 210 and causing the lamp assemblies 202 to energize. In one aspect, the transformer/regulator/charger/control 214 comprises an integrated solid-state system. The charger component can have multiple charge rates and be automatically controlled. In one aspect the DC output of the transformer/regulator/charger/control 214 can be fused 218 or otherwise protected from overcurrent conditions. In one aspect, the transformer/regulator/charger/control 214 includes a low-voltage battery cutoff. In one aspect, the transformer/regulator/charger /control 214 includes brownout sensitivity control. Battery disconnect switch 216 can be used to isolate the transformer/regulator/charger/control 214 from the battery 212 or to bypass the battery 212 and directly energize the map assemblies 202 through the transformer/regulator/charger/control 214. In one aspect, the AC power source 210 may comprise overcurrent protection (e.g., a fuse, breaker, etc.) 220 so as to limit current in the event of a fault in the system 200.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An emergency lighting system comprising:
   a battery;
   at least one LED lamp assembly;
   an AC power source;
   a control device electrically coupled to the AC power source and selectively electrically coupled to the battery and selectively electrically coupled to the at least one LED lamp assembly, wherein the control device is configured to sense AC voltage from the AC power source; and
   a means for energizing the at least one LED lamp assembly at a desired lumen level for a desired period of time in a fault operation, in which the control device senses a loss of AC voltage from the AC power source,
   wherein, in a non-fault operation, in which AC voltage from the AC power source is sensed by the control device, the at least one LED lamp assembly can be selectively energized via the AC power source or the battery, and wherein, in the fault operation, the at least one LED lamp assembly is energized via the battery.

2. The emergency lighting system of claim 1, wherein the desired period of time is a sustained period of time.

3. The emergency lighting system of claim 2, wherein the sustained period is at least eight hours.

4. The emergency lighting system of claim 1, wherein said emergency lighting system complies with Appendix "R" of 10 CFR Part 50.

5. The emergency lighting system of claim 1, wherein the battery is a lead-acid battery having an immobilized electrolyte.

6. The emergency lighting system of claim 1, wherein the control device further comprises a transformer and a rectifier, wherein the transformer and rectifier convert the AC voltage to DC voltage.

7. The emergency lighting system of claim 6, further comprising a battery charger, wherein said battery charger uses the DC voltage to charge the battery.

8. The emergency lighting system of claim 6, wherein the DC voltage is 12-volt DC voltage.

9. The emergency lighting system of claim 6, wherein the control device causes the battery to energize the at least one LED lamp assembly when the control device senses a loss of AC voltage that drops below a threshold level.

10. The emergency lighting system of claim 1, wherein the means for energizing the at least one lamp assembly comprises at least one disconnect switch, wherein the at least one disconnect switch selectively isolates the battery from the rest of the emergency lighting system.

11. The emergency lighting system of claim 10, wherein the at least one disconnect switch comprises a load disconnect switch coupled to the at least one lamp assembly and switchably coupled to the battery and switchably coupled the AC power source.

12. The emergency lighting system of claim 11, wherein the at least one disconnect switch further comprises a battery disconnect switch coupled to the AC power source and switchably coupled to the battery and switchably coupled the load disconnect switch.

13. The emergency lighting system of claim 1, wherein the at least one LED lamp assembly comprises two LED lamp assemblies.

14. The emergency lighting system of claim 1, wherein the at least one LED lamp assembly comprises at least one PAR-46 lamp assembly.

15. The emergency lighting system of claim 1, wherein said control device causes said emergency lighting system to provide lighting in a nuclear power facility during a power outage.

16. The emergency lighting system of claim 5, wherein the battery is a maintenance-free battery comprising absorbed glass mat for immobilization of the electrolyte.

17. The emergency lighting system of claim 1, wherein the desired lumen level is a substantially constant lumen level.

18. An emergency lighting system comprising:
   a battery;
   at least one lamp assembly;
   an AC power source; and a control device electrically coupled to the AC power source and selectively electrically coupled to the battery and selectively electrically coupled to the at least one lamp assembly, wherein the control device is configured to sense AC voltage from the AC power source, wherein, when the control device senses a loss of AC voltage from the AC power source, the at least one lamp assembly is energized via the battery, and wherein when the control device senses AC voltage from the AC power source, the at least one lamp assembly can be selectively energized via the AC power source or the battery.

* * * * *